Patented Aug. 19, 1941

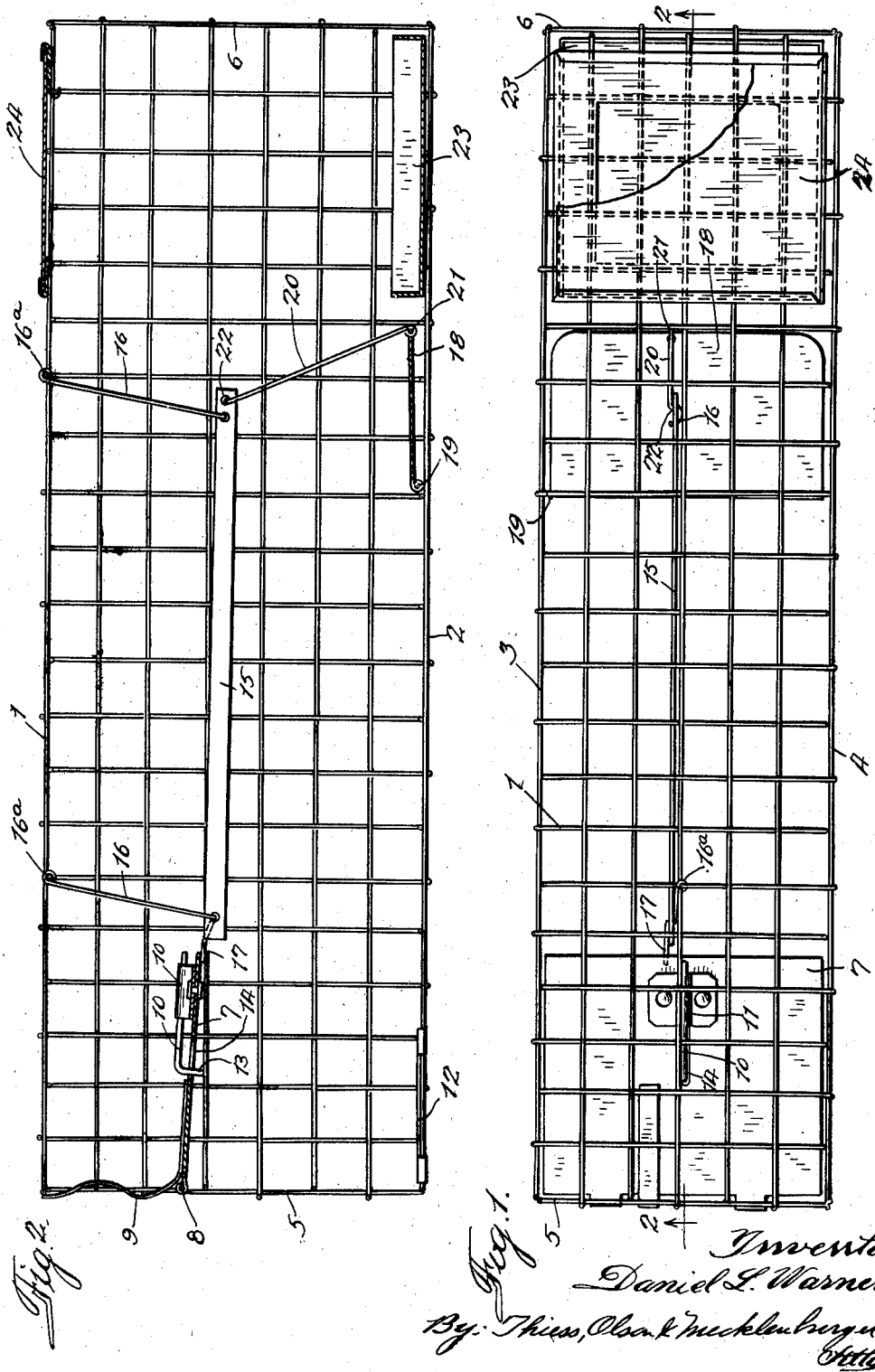

2,253,254

UNITED STATES PATENT OFFICE 2,253,254

ANIMAL TRAP

Daniel L. Warner, Rozetta, Ill.

Application September 16, 1940, Serial No. 356,925

2 Claims. (Cl. 43—61)

My invention relates to animal traps. While the trap has been designed particularly for use in catching rats, it is obvious that it may be used also for trapping other animals.

One of the objects of my invention is to provide an animal trap so designed as not to arouse the animal's suspicion of danger.

Another object is to provide an animal trap so designed that the latch and trigger apparatus are not prominent.

Another object is to provide an animal trap so designed as to insure that the animal is completely within the enclosure before the trap is sprung.

Another object is to provide a trap so designed that the trigger platform does not attract attention.

Further objects and advantages of the invention will be apparent from the description and claims.

In the drawing, in which an embodiment of my invention is shown,

Figure 1 is a plan view of an animal trap, parts being broken away; and

Fig. 2 is a sectional view substantially on the line 2—2 of Fig. 1.

Referring to the drawing in detail, the construction shown comprises an elongated rectangular enclosure which may be formed of wire mesh having top 1, bottom 2, sides 3 and 4 and ends 5 and 6. The enclosure has a rectangular opening at one end which may extend completely across the end and from the bottom about two-thirds of the way up to the top. A door 7 is provided for closing this opening pivoted adjacent its upper edge, as indicated at 8, and movable from a raised open position inside the enclosure, as shown in Fig. 2, to a position in which it closes the opening. A spring 9 may be provided for closing the door when it is released from the latch. A latch is provided for latching the door in closed position, comprising a latch pin 10 slidably mounted in a strap 11 riveted to the inside of the door and a catch plate 12 secured to the bottom of the cage. The latch pin 10 has a handle portion 13 which extends through a slot 14 in the door so that the latch can be released readily from the outside to enable it to be lifted into position to be latched. When the door is released from the latch which holds it open, it is swung downwardly by the spring 9 into closed position. The lower end of the latch pin 10 engages the latch plate 12 in the final closing movement and is lifted up by sliding along the latch plate until the latch pin 10 has passed the edge of the latch plate 12, whereupon it drops down into latching engagement with the edge of the plate.

The latch means for holding the door 7 in raised open position comprises a bar 15 extending longitudinally of the enclosure and a pair of spaced swinging suspension links 16 pivotally connected to the bar 15 and extending upwardly therefrom, and pivotally connected at 16a with the top of the cage. This pivotal connection with the top of the cage may be made by bending the ends of the links about the transverse mesh wires. The latching means has a portion movable into and out of latching engagement with the door. This may be accomplished by bending the end 17 of the left-hand swinging link 16 so as to engage underneath the edge of the swinging door. The pressure of the door on the latch hook 17 holds the latch in engaged position until it is released by the trigger mechanism hereinafter described. This trigger mechanism comprises a platform 18 pivotally mounted at 19 adjacent the edge nearest the door, and a link 20 pivotally connected at 21 with the swinging edge of the platform and also pivotally connected at 22 with the longitudinally movable bar.

A bait receptacle 23 may be provided on the side of the platform remote from the door, thus insuring that the animal will step on the trigger platform before he gets to the bait. A slide door 24 may be provided at the upper rear end of the enclosure, through which bait may be placed in the bait receptacle, and through which the animal may be removed.

In use, the trap is set as indicated in Fig. 2, with the door 7 held in raised position by the latch projection 17 engaging underneath the edge of the door. This latching may be accomplished in various ways but one way by which the door may be easily latched is to push the door 7 inwardly and upwardly above the latching position, and then hold the enclosure at such an inclination that gravity will swing the latching projection 17 underneath the edge of the door and then allow the door to swing downwardly until its swinging edge is engaged by the latching projection 17. The trap thus set is placed in any desired location. The animal, attracted by the bait in the cage, enters the opening and advances toward the bait receptacle. As the trigger platform 18 is pivoted at the end nearest the door and as its axis is very close to the floor line, it offers no obstruction to the animal's progress and does not arouse his suspicion. The weight of the animal on the trigger platform tends to swing the longitudinally-movable bar 15 to the right, as viewed in Fig. 2, drawing the latching projection 17 out from underneath the edge of the swinging door. The right-hand link 16 and the link 20 together form a toggle mechanism which, when straightened out, moves the latch bar 15 to the right. As soon as the swinging door is released, it snaps downwardly into latching engagement with the latch plate.

It is obvious that a multiple compartment trap might be made by adding other compartments, either side by side or end to end.

I claim:

1. An animal trap comprising an enclosure having an opening at one end, a door for closing said opening pivoted adjacent its upper edge and movable from a raised open position inside the enclosure to a position in which it closes said opening, latching means for holding the door in raised open position comprising a bar extending longitudinally of the enclosure and a pair of spaced swinging suspension links pivotally connected to said bar and extending upwardly therefrom, said latching means comprising a portion movable into and out of latching engagement with the door and trigger means for releasing said latch comprising a pivoted platform on which the animal steps, and a link pivotally connected at one end with the pivoted platform and pivotally connected at its other end with the longitudinally-extending bar, said last link and one of said upwardly-extending links together forming a toggle which, when straightened out, releases said latching means.

2. An animal trap comprising an enclosure having an opening at one end, a door for closing said opening pivoted adjacent its upper edge and movable from a raised open position inside the enclosure to a position in which it closes said opening, latching means for holding the door in raised open position comprising a latching member, and means for supporting, guiding, and releasing said latching member comprising a toggle mechanism, one link of which has its lower end pivotally connected with said latching member and its upper end pivotally supported by said enclosure, the other link of the toggle having its upper end pivotally connected with said latching member, and a pivoted platform onto which the animal steps, to which platform the lower end of said other link is pivotally secured whereby downward movement of the platform straightens out the toggle and releases the latching member.

DANIEL L. WARNER.